(12) United States Patent
Ruscak et al.

(10) Patent No.: US 10,399,437 B2
(45) Date of Patent: Sep. 3, 2019

(54) COUPLED COMPOUND PLANETARY TRANSMISSION FOR A WHEEL UNIT

(71) Applicant: Joy MM Delaware, Inc., Wilmington, DE (US)

(72) Inventors: Ian Ruscak, Franklin, PA (US); Tyler Good, Smicksburg, PA (US); Terry Thomas, Franklin, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 113 days.

(21) Appl. No.: 15/256,789

(22) Filed: Sep. 6, 2016

(65) Prior Publication Data

US 2018/0065478 A1 Mar. 8, 2018

(51) Int. Cl.
| | | |
|---|---|---|
| *B60K 17/04* | (2006.01) | |
| *B60K 7/00* | (2006.01) | |
| *F16H 1/28* | (2006.01) | |
| *F16H 37/04* | (2006.01) | |
| *E21F 13/02* | (2006.01) | |
| *F16D 3/223* | (2011.01) | |
| *B60K 1/00* | (2006.01) | |
| *B60K 17/356* | (2006.01) | |

(52) U.S. Cl.
CPC .............. *B60K 17/046* (2013.01); *B60K 7/00* (2013.01); *F16H 1/28* (2013.01); *F16H 37/04* (2013.01); *B60K 1/00* (2013.01); *B60K 17/356* (2013.01); *B60Y 2200/41* (2013.01); *E21F 13/025* (2013.01); *F16D 3/223* (2013.01)

(58) Field of Classification Search
CPC ............................ B60K 17/306; B60K 17/046

USPC ......................................................... 180/372
See application file for complete search history.

(56) References Cited

U.S. PATENT DOCUMENTS

| 1,856,831 | A | * | 5/1932 | Guy ..................... B60K 17/306 |
| | | | | 180/245 |
| 2,598,876 | A | * | 6/1952 | Ash ......................... B60K 17/14 |
| | | | | 180/255 |
| 2,785,907 | A | * | 3/1957 | Hutchens ................. B60G 3/20 |
| | | | | 244/111 |

(Continued)

OTHER PUBLICATIONS

"Curtis-Wright Power Hinge", publicly available before Sep. 5, 2015, 1 page, Curtis Wright Flight Systems Inc., Fairfield, NJ.

*Primary Examiner* — Sherry L Estremsky
(74) *Attorney, Agent, or Firm* — Michael Best & Friedrich LLP

(57) ABSTRACT

A wheel unit includes a suspension housing having a pin defining a steering axis, a transmission housing pivotable about the steering axis, a wheel rim rotatable about a rotational axis and configured to pivot about the steering axis, and a coupled compound planetary transmission drivingly engaged with the wheel rim. The coupled compound planetary transmission includes an input drive shaft, a sun gear rotatable about the rotational axis, a constant velocity joint coupled between the input drive shaft and the sun gear, a first ring gear fixed relative to the transmission housing, a first planet gear enmeshed with the sun gear and the first ring gear, a second ring gear fixed relative to the wheel rim for co-rotation about the rotational axis, a second planet gear enmeshed with the second ring gear, and a shaft coupling the first planet gear and the second planet gear for co-rotation.

28 Claims, 6 Drawing Sheets

(56) References Cited

U.S. PATENT DOCUMENTS

| | | | | |
|---|---|---|---|---|
| 2,801,702 A * | 8/1957 | Armington | ........... | B60K 17/306 180/255 |
| 2,858,897 A * | 11/1958 | Sibley | ................ | B60K 17/306 180/255 |
| 2,941,423 A | 6/1960 | Armington et al. | | |
| 3,227,237 A * | 1/1966 | Moreno | ............... | B60K 17/306 180/255 |
| 3,420,327 A * | 1/1969 | Nallinger | ............ | B60K 17/046 180/255 |
| 3,469,647 A * | 9/1969 | Brown | ................. | B60K 17/046 180/255 |
| 3,477,547 A * | 11/1969 | Kress | ................... | B60K 7/0015 180/308 |
| 3,737,000 A * | 6/1973 | Knobloch | ............ | B60K 17/046 180/369 |
| 3,963,260 A * | 6/1976 | Inbody | .................... | B60T 1/065 280/124.126 |
| 4,020,716 A | 5/1977 | Toth et al. | | |
| 4,089,383 A * | 5/1978 | Blood | ................... | B60K 17/043 180/254 |
| 4,158,971 A | 6/1979 | Szalai et al. | | |
| 4,162,713 A * | 7/1979 | Heitman | ............... | B60K 7/0015 180/242 |
| 4,245,712 A * | 1/1981 | Itey-Bernard | ............ | B60K 1/02 180/246 |
| 4,291,779 A | 9/1981 | Mann et al. | | |
| 4,380,274 A * | 4/1983 | Abraham | .............. | B60K 17/046 180/308 |
| 4,662,246 A | 5/1987 | Cheek et al. | | |
| 4,873,894 A | 10/1989 | Avery et al. | | |
| 4,932,613 A | 6/1990 | Tiedeman et al. | | |
| 5,356,351 A * | 10/1994 | Hvolka | ................ | B60K 17/046 180/255 |
| 6,588,539 B2 | 7/2003 | Hinton et al. | | |
| 6,811,514 B2 * | 11/2004 | Bowman | .............. | B60K 7/0007 180/372 |
| 7,216,731 B2 * | 5/2007 | Kakinami | ................ | B60K 7/00 180/65.1 |
| 7,669,684 B2 | 3/2010 | Rogg | | |
| 8,500,591 B2 | 8/2013 | Turner et al. | | |
| 8,840,500 B2 | 9/2014 | Tamai et al. | | |
| 9,132,723 B2 | 9/2015 | Munster et al. | | |

\* cited by examiner

ROTARY POWER TRANSMISSION PATH →

COUPLED COMPOUND PLANETARY TRANSMISSION FOR A WHEEL UNIT

BACKGROUND OF THE INVENTION

The present invention relates to a wheel unit, and in particular to, a coupled compound planetary transmission configured to drive the wheel unit.

Mining vehicles (e.g., haulage vehicles) include a wheel unit with a transmission that is limited to about a 10:1 gear reduction ratio due to packing constraints. In other words, the gear reduction ratio is limited by the size of wheel units and the transmission configuration.

SUMMARY OF THE INVENTION

In one aspect, a wheel unit for a vehicle that includes a suspension housing including a pin defining a steering axis, a transmission housing coupled to the suspension housing by the pin and pivotable about the steering axis, a wheel rim rotatable about a rotational axis and configured to pivot about the steering axis with the transmission housing, and a coupled compound planetary transmission drivingly engaged with the wheel rim. The coupled compound planetary transmission includes an input drive shaft coupled to the suspension housing, a sun gear rotatable about the rotational axis, a constant velocity joint coupled between the input drive shaft and the sun gear, a first ring gear fixed relative to the transmission housing, a first planet gear enmeshed with the sun gear and the first ring gear, a second ring gear fixed relative to the wheel rim for co-rotation about the rotational axis, a second planet gear enmeshed with the second ring gear, and a shaft coupling the first planet gear and the second planet gear for co-rotation, wherein rotation of the input drive shaft results in rotation of the second ring gear.

In another aspect, a wheel unit for a vehicle that includes a suspension housing having a king pin defining a steering axis, a pivot housing coupled to the suspension housing by the king pin and pivotable about the steering axis, a wheel rim rotatable about a rotational axis and configured to pivot about the steering axis with the pivot housing, and a coupled compound planetary transmission drivingly engaged with the wheel rim. The coupled compound planetary transmission includes an input drive shaft coupled to the suspension housing, a sun gear rotatable about the rotational axis and pivotable about the steering axis with the pivot housing, a constant velocity joint coupled between the input drive shaft and the sun gear, a first ring gear fixed to the pivot housing, an output hub including a second ring gear rotatable about the wheel rotational axis and configured to pivot about the steering axis with the pivot housing, and a planet cage configured to support a first planet gear and a second planet gear. The first planet gear is enmeshed with the sun gear and the first ring gear, and the second planet gear is enmeshed with the second ring gear. The coupled compound planetary transmission also includes a shaft coupling the first planet gear and the second planet gear for co-rotation about a central axis of the shaft and about the rotational axis, wherein rotation of the input drive shaft results in rotation of the output hub.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, whether direct or indirect.

Figure 1:
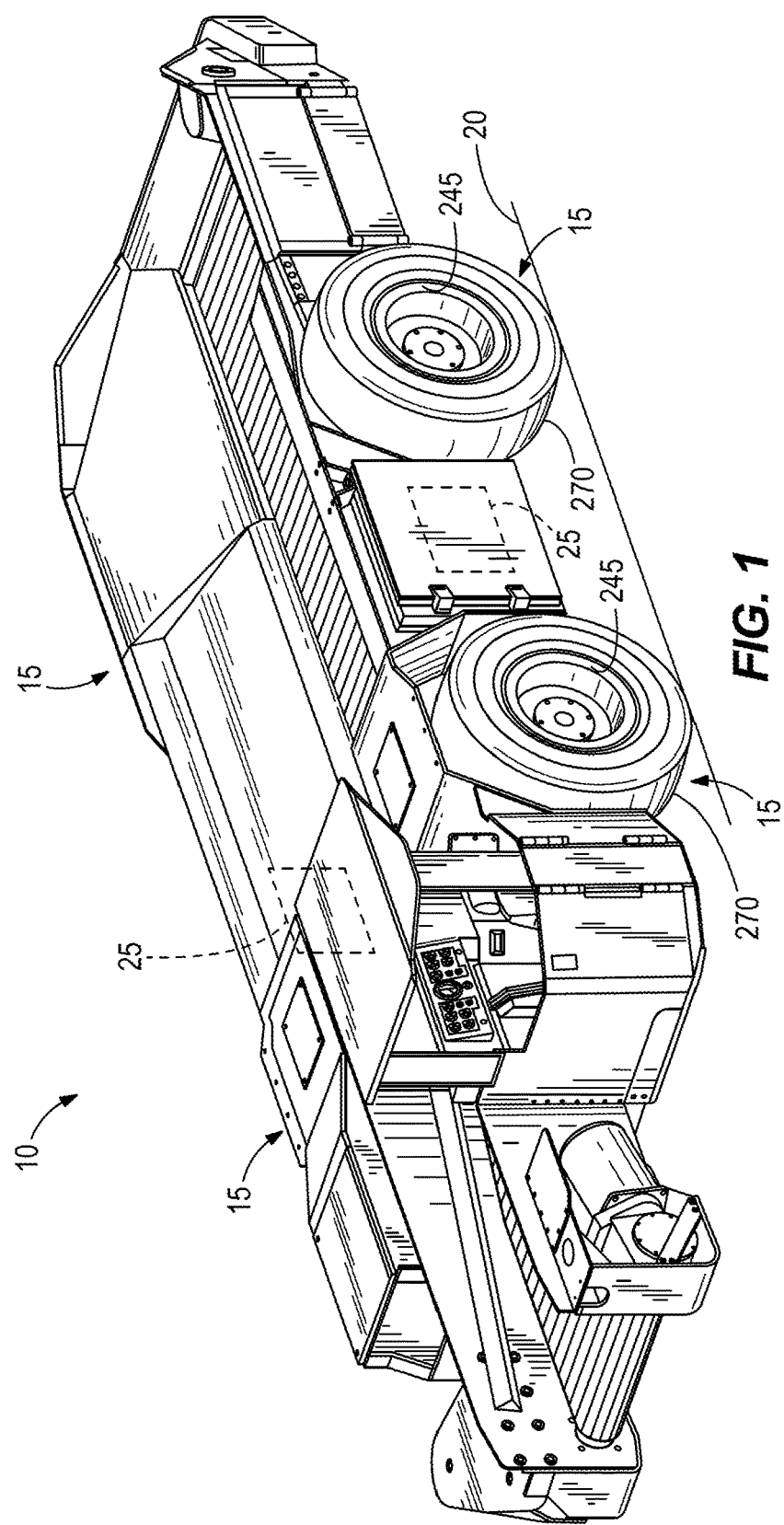
FIG. 1 is a perspective view of a haulage vehicle moveable by a wheel unit embodying the invention.

FIG. 1 illustrates a vehicle 10 including a plurality of wheel units 15 configured to support and move the vehicle 10 relative to a surface 20. In the illustrated embodiment, the vehicle 10 is a haulage vehicle (e.g., a shuttle car) configured to receive material (e.g., soil, dirt, rock, etc.) during a mining operation; however, in other embodiments, the vehicle 10 may be a different type of vehicle related or unrelated to a mining operation (e.g. a construction vehicle, an agricultural vehicle, a forestry vehicle, etc.). The illustrated vehicle 10 includes one or more prime movers 25 (e.g., an electric motor) drivably coupled to four wheel units 15 (only two wheel units 15 are shown in FIG. 1). In particular, each electric motor 25 is coupled to a pair of wheel units 15 located on respective left or right sides of the vehicle 10. In other embodiments, the vehicle 10 may include one electric motor 25 drivably coupled to all four wheel units 15. In further embodiments, the vehicle 10 may include more or less than four wheel units 15 and/or the prime movers 25 may be internal combustion engines.

Figure 2:
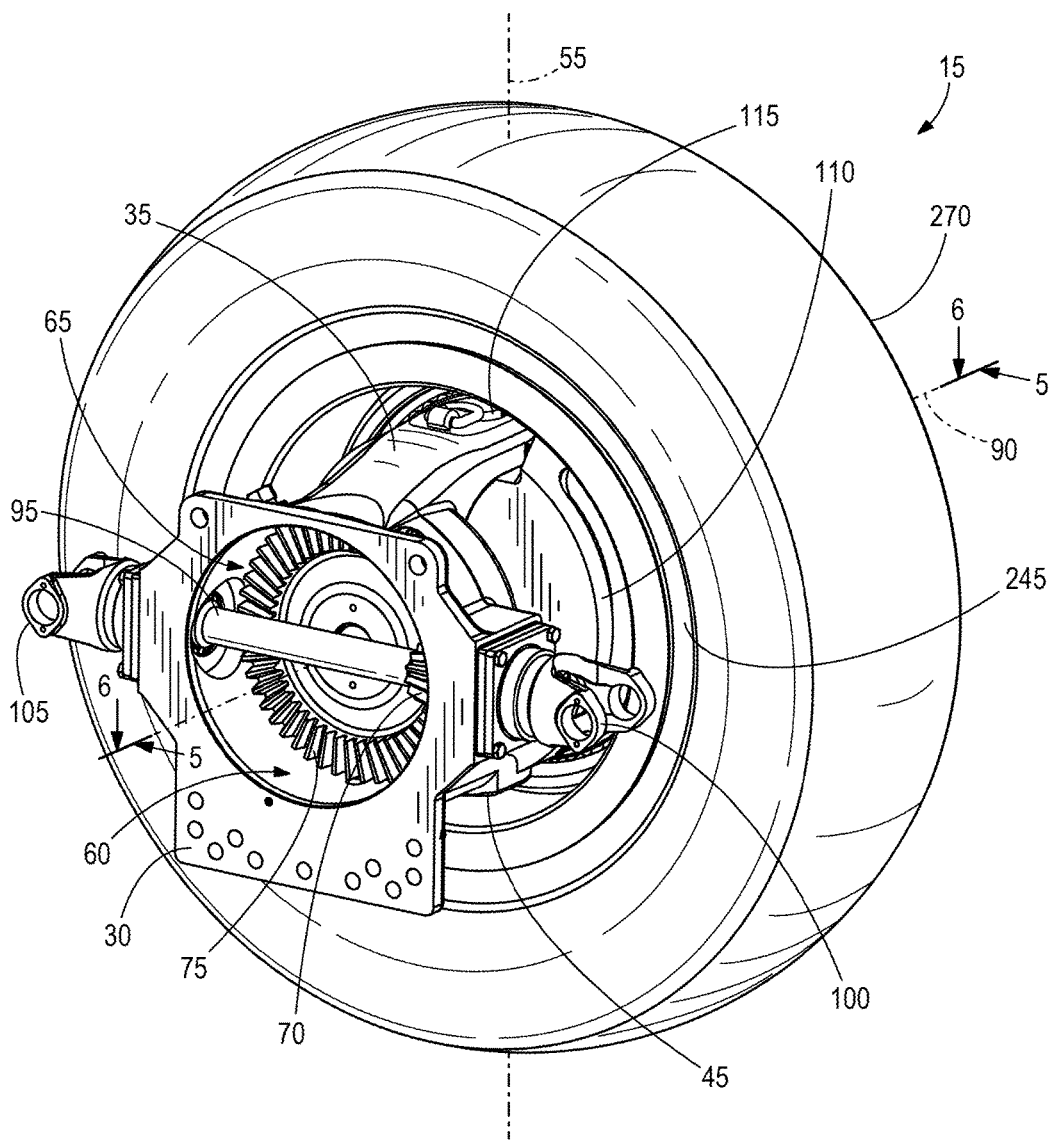
FIG. 2 is a rear perspective view of the wheel unit of FIG. 1.
Figure 3:
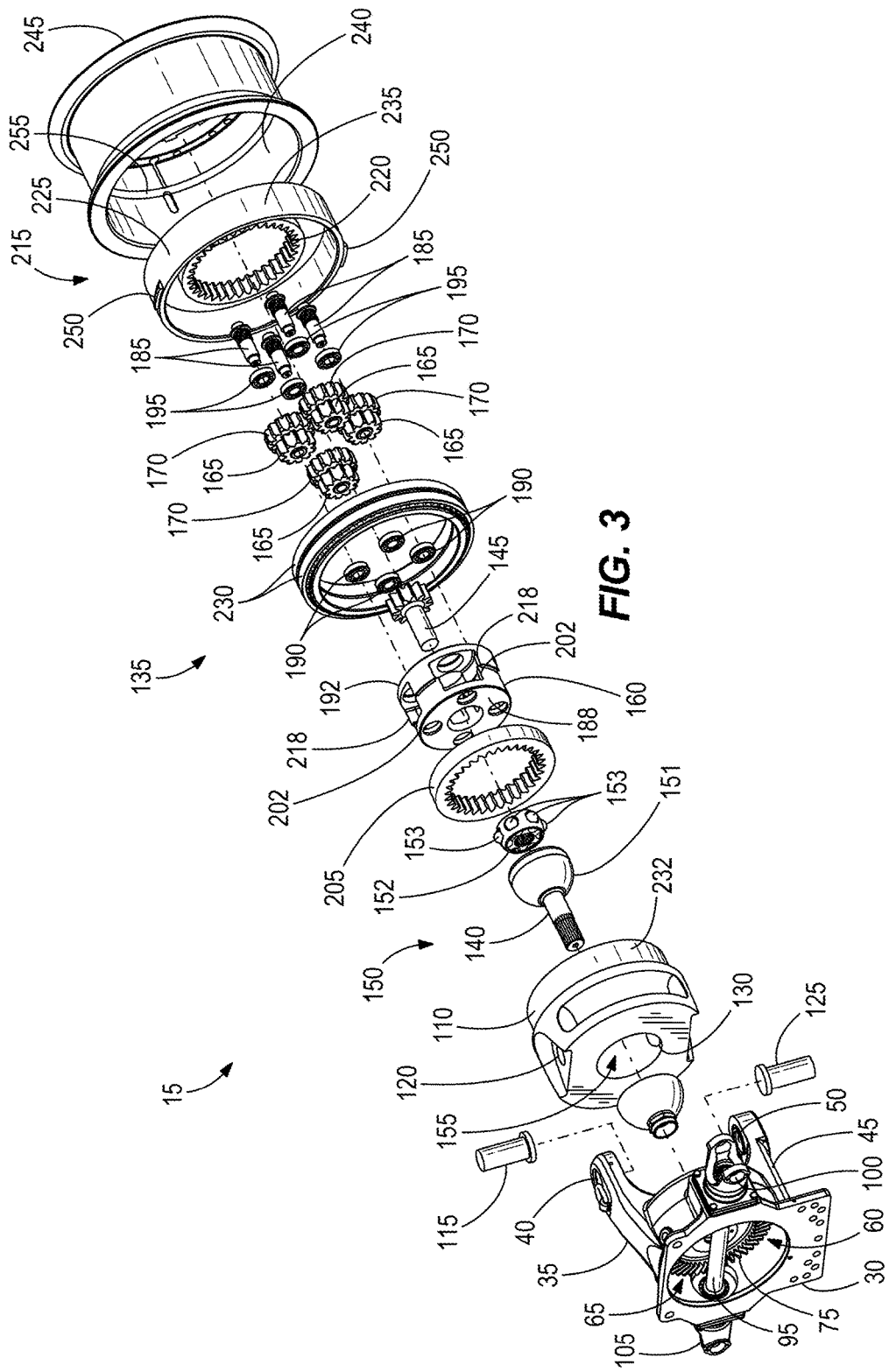
FIG. 3 is a rear exploded view of the wheel unit of FIG. 2.
Figure 4:
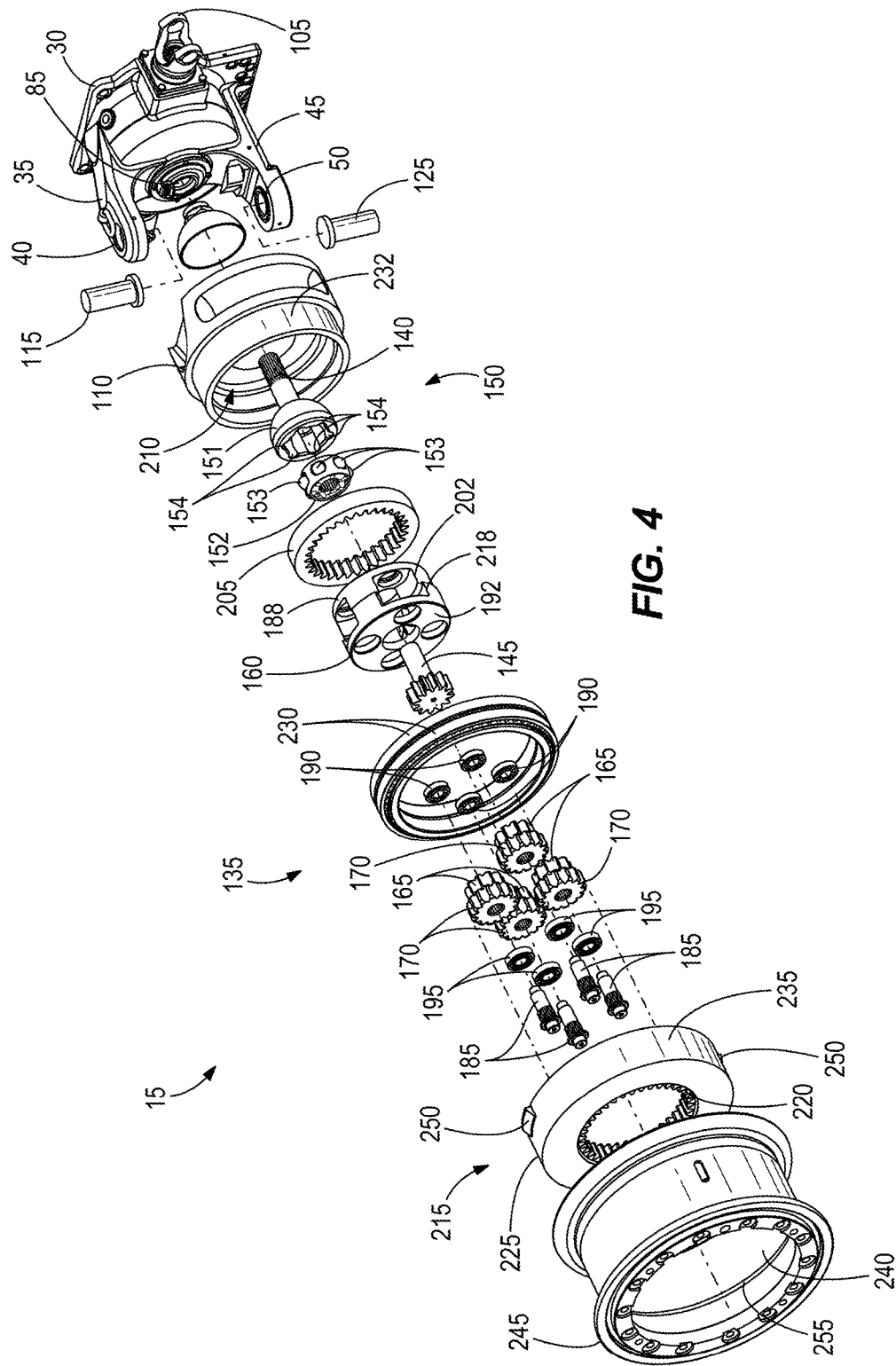
FIG. 4 is a front exploded view of the wheel unit of FIG. 2.
Figure 5:
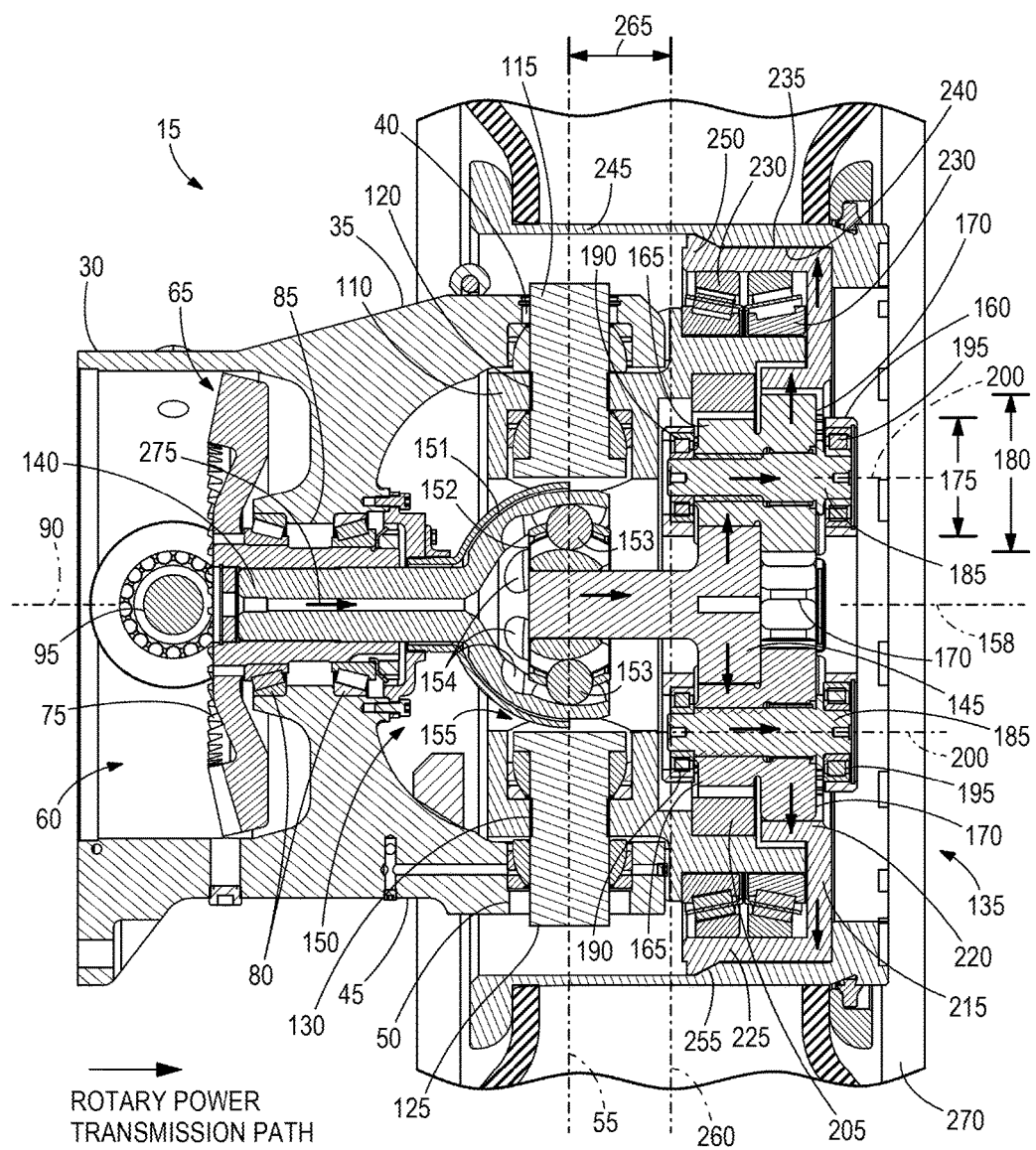
FIG. 5 is a cross sectional view taken along line 5-5 of the wheel unit of FIG. 2.

With reference to FIGS. 2-4, the wheel units 15 include a suspension housing 30 affixed to a chassis of the vehicle 10 having an upper arm 35 with an upper aperture 40 and a lower arm 45 with a lower aperture 50. In the illustrated embodiment, the upper and lower apertures 40, 50 are concentric to define a kingpin or steering axis 55 (FIGS. 2 and 5). The illustrated suspension housing 30 also includes a cavity 60 that receives a bevel gear assembly 65 having a first bevel gear 70 and a second bevel gear 75. As shown in FIG. 5, two bevel gear bearings 80 rotatably support the second bevel gear 75 within a central aperture 85 of the suspension housing 30 about a fixed rotational axis 90.

With continued reference to FIGS. 2-4, the first bevel gear 70 is enmeshed with the second bevel gear 75 and is driven by a driveshaft 95, which is coupled to a first yoke 100 extending from a first side of the suspension housing 30 and a second yoke 105 extending from a second opposing side of the suspension housing 30. In the illustrated embodiment, the driveshaft 95 is perpendicular to the fixed rotational axis 90. The first and second yokes 100, 105 are configured to be coupled with either the electric motor 25 or another wheel unit 15. For example, in one configuration, the first yoke 100 is drivingly coupled to an output of the electric motor 25 and the second yoke 105 is drivingly coupled to a corresponding first yoke 100 on a second, adjacent wheel unit 15. In other words, the electric motor 25 drives the bevel gear assembly 65 by one of the first and second yokes 100, 105, and the other yoke 100, 105 drives another wheel unit 15.

With reference to FIGS. 3-5, a transmission housing 110 (i.e., a pivot housing) is pivotably coupled to the suspension housing 30 about the steering axis 55, which is perpendicular to the fixed rotational axis 90 and the driveshaft 95. In particular, an upper pin 115 (i.e., an upper kingpin) is receivable through an upper aperture 120 of the transmission housing 110 and the upper aperture 40 of the suspension housing 30, and a lower pin 125 (i.e., a lower kingpin) is receivable through a lower aperture 130 of the transmission housing 110 and the lower aperture 50 of the suspension housing 30. As such, the upper and lower pins 115, 125 are concentric with the steering axis 55. As explained in greater detail below, the transmission housing 110 pivots with respect to the suspension housing 30 about the steering axis 55 in order to steer the vehicle 10.

Figure 6:
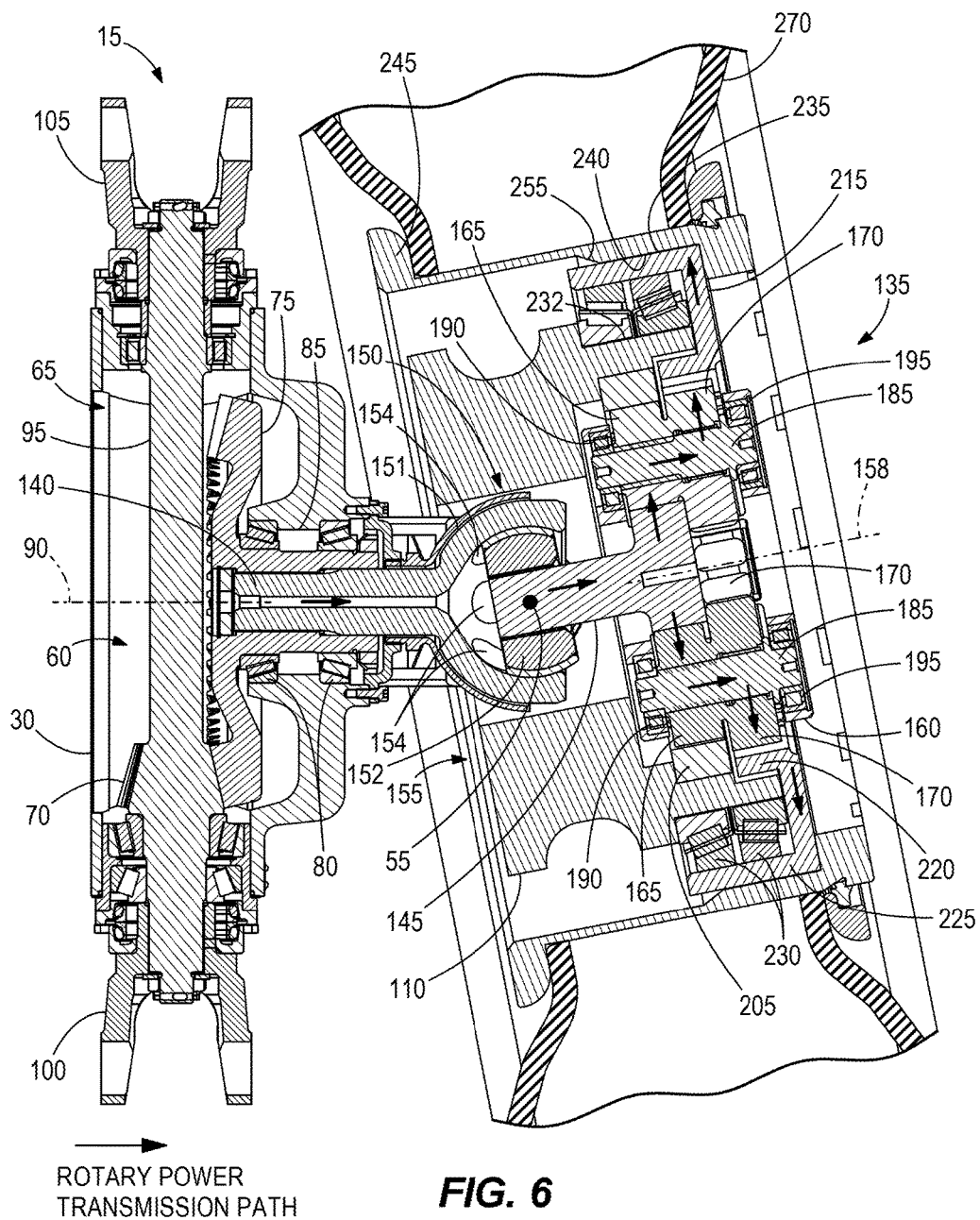
FIG. 6 is a cross sectional view taken along line 6-6 of the wheel unit of FIG. 2 while the wheel unit is pivoted to steer the haulage vehicle.

With continued reference to FIGS. 3-5, a coupled compound planetary transmission 135 is supported by the suspension housing 30 and the transmission housing 110. The coupled compound planetary transmission 135 includes an input drive shaft 140 and a sun gear 145 that are coupled together for co-rotation by a constant velocity joint (i.e., CVJ) 150. The illustrated input drive shaft 140 is coupled to the second bevel gear 75 by a spline engagement for co-rotation therewith. The CVJ 150 includes a dome-shaped housing 151 formed on the input drive shaft 140. The dome-shaped housing 151 receives a circular cage 152 carrying a plurality of balls 153, and the circular cage 152 is coupled to the sun gear 145. The plurality of balls 153 are received within corresponding grooves 154 formed on an inner surface of the dome-shaped housing 151 (FIG. 4). In the illustrated embodiment, the CVJ 150 is a Rzeppa joint, but other CVJ varieties may be utilized in alternative embodiments. The CVJ 150 is positioned within a first interior portion 155 of the transmission housing 110 and enables the sun gear 145 to pivot relative to the input drive shaft 140. In particular, the CVJ 150 is configured to bend the fixed rotational axis 90, which is concentric with the input drive shaft 140, about the steering axis 55 into a moveable rotational axis 158, which is concentric with the sun gear 145 (FIG. 6). In other words, the moveable rotational axis 158 is pivotable relative to the fixed rotational axis 90 about the steering axis 55.

The illustrated coupled compound planetary transmission 135 also includes a planet cage 160 that receives the sun gear 145 therein and supports a plurality of first planet gears 165 and a plurality of second planet gears 170. The sun gear 145 and corresponding first and second planet gears 165, 170 are configured to rotate about the sun gear 145 (i.e., about the moveable rotational axis 158). The illustrated first planet gears 165 include a first diameter 175 (FIG. 5) that is smaller than a second diameter 180 of the second planet gears 170. In the illustrated embodiment, the first diameter 175 is about 90 millimeters (mm), the second diameter 180 is about 126 mm, and a ratio between the first and second diameters 175, 180 is about 1.4:1. In other embodiments, the ratio between the first and second diameters 175, 180 is between about 1.1:1 to about 5:1. In further embodiments, the first diameter 175 may be greater than the second diameter 180. In the illustrated embodiment, each of the first planet gears 165 is integrally formed with a corresponding second planet gear 170. A planet gear shaft 185 drivingly couples a pair of first and second planet gears 165, 170 for co-rotation therewith. The illustrated planet gear shafts 185 are coupled to a first end 188 of the planet cage 160 by inboard shaft bearings 190 and are coupled to a second end 192 of the planet cage 160 by outboard shaft bearings 195. As such, the first and second shaft bearings 190, 195 are configured to enable rotation of the planet gear shafts 185 and the first and second planet gears 165, 170 about a central axis 200 (FIG. 5) of each planet gear shaft 185. In other embodiments, the first and second planet gears 165, 170 may be separate and distinct gears coupled to the planet gear shafts 185 for co-rotation therewith.

In addition, a portion of the first planet gears 165 extends from a first set of windows 202 formed in an outer circumferential surface of the planet cage 160 to enmesh with a first ring gear 205. The first ring gear 205 is affixed (e.g., via a press-fit engagement) within a second interior portion 210 of the transmission housing 110. A portion of the second planet gears 170 extends from a second set of windows 218 formed in the outer circumferential surface of the planet cage 160 to couple with a second ring gear 220 formed on an output hub 215. In the illustrated embodiment, the second ring gear 220 of the output hub 215 is positioned within the second interior portion 210 to enmesh with the second planet gears 170.

With continued reference to FIGS. 3-5, the output hub 215 includes a flange 225 extending outside of the second interior portion 210. A housing bearing 230 is positioned between the flange 225 of the output hub 215 and an outer circumferential surface 232 of the transmission housing 110 to enable rotation of the output hub 215 relative to the transmission housing 110 about the moveable rotational axis 158. The flange 225 includes an outer surface 235 that directly engages (e.g., via a press-fit engagement) an inner surface 240 of a wheel rim 245 to rotatably fix the wheel rim 245 to the output hub 215. The flange 225 also includes tapering protrusions 250 (e.g., two protrusions 250 angularly spaced 180 degrees apart) that engage a step 255 of the inner surface 240 to position and center the output hub 215 within the wheel rim 245 along the moveable rotational axis 158.

With reference to FIG. 5, the wheel rim 245 includes a vertical, central axis 260 that is oriented substantially parallel to the steering axis 55 and is spaced from the steering axis 55 by a distance 265. The illustrated distance 265 is about 80 mm. In other embodiments, the distance 265 may be less than 150 mm. As described in more detail below, minimizing the distance 265, for example, reduces load forces on the upper and lower pins 115, 125 and reduces steering forces acting on the wheel unit 15. Furthermore, a tire 270 is coupled to the wheel rim 245 to align with the central axis 260 for co-rotation with the wheel rim 245 to engage the surface 20 providing traction to the vehicle 10. In other embodiments, the tire 270 may be a continuous track coupled to wheel rims 245 of multiple wheel units 15 that engages the surface 20.

With reference to FIG. 5, as the electric motor 25 drives the bevel gear assembly 65, a rotary power transmission path 275 travels from the bevel gear assembly 65 through the coupled compound planetary transmission 135 and to the tire 270 providing movement of the vehicle 10. When the vehicle 10 is desired to be steered straight, as shown in FIG. 5, the fixed rotational axis 90 is substantially coaxial with the moveable rotational axis 158 for the input drive shaft 140 to linearly drive the sun gear 145. The sun gear 145 then drives the first planet gears 165 about the moveable rotational axis 158, which also rotates the planet cage 160 about the moveable rotational axis 158. Because the first ring gear 205 is fixed to the transmission housing 110 (e.g., the first ring gear 205 remains fixed relative to the moveable rotational axis 158), the rotary power transmission path 275 is directed toward the second planet gears 170. In addition, the first ring gear 205 supports the first planet gears 165 to provide efficient transfer of the rotary power transmission path 275 from the first planet gears 165 to the second planet gears 170 with the first and second planet gears 165, 170 and the planet gear shafts 185 rotating at the same angular velocity.

The difference between the first and second diameters 175, 180, as well as the size of the sun gear 145, and the first and second ring gears 205, 220 provides a gear reduction ratio that is greater than conventional transmissions. In the illustrated embodiment, the first and second planet gears 165, 170 are sized to provide a gear reduction ratio of about 15:1. In addition, the greater gear reduction ratio of the compound planetary transmission 135 reduces torsional forces (e.g., torque) acting on components located upstream relative to the first and second planet gears 165, 170 (e.g., the sun gear 145, the CVJ 150, the input drive shaft 140, and the bevel gear assembly 65). The reduced torsional forces acting on these components allows for size reduction of these components enabling these components to rotate at a higher angular velocity. The reduced torsional forces also improve the reliability of the wheel unit 15. In some embodiments, brake systems may be coupled to one or more wheel units 15.

After the rotary power transmission path 275 travels from the first planet gear 165 to the second planet gear 170, the rotary power transmission path 275 then drives the output hub 215 about the moveable rotational axis 158. Because the output hub 215 is fixed to the wheel rim 245 and the tire 270, the wheel rim 245 and the tire 270 also rotate about the moveable rotational axis 158 resulting in linear movement of the vehicle 10.

With reference to FIG. 6, when the vehicle 10 is desired to be steered left or right, the transmission housing 110 is pivoted about the steering axis 55 such that all components downstream of the CVJ 150 are also pivoted in the same direction about the steering axis 55. As such, the fixed rotational axis 90 is not aligned with the moveable rotational axis 158 when the input drive shaft 140 drives the sun gear 145, and the rotary power transmission path 275 moves through the compound planetary transmission 135 in the same manner as described above. In one embodiment, the transmission housing 110 includes a yoke extending therefrom that is coupled to a hydraulic cylinder and linkage assembly operable to pivot the transmission housing 110 relative to the suspension housing 30 to steer the vehicle 10.

Furthermore, the illustrated compound planetary transmission 135 is sized and configured to provide a greater gear reduction ratio (as described above), as well as to provide a dense packaging of components within the wheel rim 245. The dense packaging of the compound planetary transmission 135 allows for a decrease in the distance 265 between the central axis 260 of the wheel rim 245 and the tire 270 and the steering axis 55. Decreasing the distance 265 reduces load forces on the upper and lower pins 115, 125, reduces steering forces, and reduces scrubbing of the tires 270 relative to the surface 20 when the wheel unit 15 is steered left or right. In addition, decreasing the distance 265 allows for improved bearing (e.g., the housing bearings 230) placement within the wheel rim 245 to minimize moment forces as the wheel unit 15 is steered left or right, as well as improving reliability and service life of the wheel units 15.

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. A wheel unit for a vehicle, the wheel unit comprising:
 a suspension housing including a pin defining a steering axis;
 a transmission housing coupled to the suspension housing by the pin and pivotable about the steering axis;
 a wheel rim rotatable about a rotational axis and configured to pivot about the steering axis with the transmission housing; and
 a compound planetary transmission drivingly engaged with the wheel rim, the compound planetary transmission including,
  an input drive shaft coupled to the suspension housing,
  a sun gear rotatable about the rotational axis,
  a constant velocity joint coupled between the input drive shaft and the sun gear,
  a first ring gear fixed relative to the transmission housing,
  a first planet gear enmeshed with the sun gear and the first ring gear,
  a second ring gear fixed relative to the wheel rim for co-rotation about the rotational axis,
  a second planet gear enmeshed with the second ring gear, and
  a shaft coupled to the first planet gear and the second planet gear;
 wherein rotation of the input drive shaft results in rotation of the second ring gear; and
 wherein the first planet gear includes a first diameter and the second planet gear includes a second diameter, and wherein the first diameter is smaller than the second diameter.

2. The wheel unit of claim 1, wherein the wheel rim defines a central axis oriented parallel to the steering axis, and wherein the central axis is located about 80 millimeters from the steering axis.

3. The wheel unit of claim 1, wherein the input drive shaft is driven by a bevel gear assembly that is coupled to a prime mover.

4. The wheel unit of claim 3, wherein the bevel gear assembly includes a first bevel gear and a second bevel gear, and wherein at least a portion of the first and second bevel gears are located within a cavity of the suspension housing.

5. The wheel unit of claim 4, wherein the first bevel gear is coupled to a first yoke and a second yoke by a driveshaft, and wherein the first yoke is driven by the prime mover and the second yoke is configured to couple a plurality of wheel units together.

6. The wheel unit of claim 1, wherein the second ring gear is rotatably coupled to the transmission housing by a housing bearing.

7. The wheel unit of claim 1, further comprising a planet cage supporting the first and second planet gears, wherein the planet cage co-rotates with the first and second planet gears about the rotational axis.

8. The wheel unit of claim 7, wherein the shaft is coupled to a first end of the planet cage by a first shaft bearing, and the shaft is coupled to a second end of the planet cage by a second shaft bearing, and wherein the first and second shaft bearings are configured to enable rotation of the shaft relative to the planet cage about a central axis of the shaft.

9. The wheel unit of claim 1, wherein the second ring gear is integral with an output hub, and wherein an outer surface of the output hub directly engages an inner surface of the wheel rim to rotationally fix the wheel rim to the output hub.

10. The wheel unit of claim 9, wherein the output hub is configured to be in a press-fit engagement with the wheel rim.

11. The wheel unit of claim 1, wherein the first ring gear is positioned within the transmission housing.

12. A wheel unit for a vehicle, the wheel unit comprising:
   a suspension housing including a king pin defining a steering axis;
   a pivot housing coupled to the suspension housing by the king pin and pivotable about the steering axis;
   a wheel rim rotatable about a rotational axis and configured to pivot about the steering axis with the pivot housing; and
   a compound planetary transmission drivingly engaged with the wheel rim, the compound planetary transmission including,
      an input drive shaft coupled to the suspension housing,
      a sun gear rotatable about the rotational axis and pivotable about the steering axis with the pivot housing,
      a constant velocity joint engaging the input drive shaft and the sun gear,
      a first ring gear fixed to the pivot housing,
      an output hub including a second ring gear rotatable about the wheel rotational axis and configured to pivot about the steering axis with the pivot housing,
      a planet cage configured to support a first planet gear and a second planet gear, the first planet gear is enmeshed with the sun gear and the first ring gear, the second planet gear is enmeshed with the second ring gear, and
      a shaft coupling the first planet gear and the second planet gear for co-rotation about a central axis of the shaft and about the rotational axis;
   wherein rotation of the input drive shaft results in rotation of the output hub; and
   wherein the shaft is coupled to a first end of the planet cage by a first shaft bearing, and the shaft is coupled to a second end of the planet cage by a second shaft bearing.

13. The wheel unit of claim 12, wherein the wheel rim defines a central axis oriented parallel to the steering axis, and wherein the central axis is located about 80 millimeters from the steering axis.

14. The wheel unit of claim 12, wherein the input drive shaft is driven by a bevel gear assembly that is coupled to a prime mover.

15. The wheel unit of claim 14, wherein the bevel gear assembly includes a first bevel gear and a second bevel gear, and wherein at least a portion of the first and second bevel gears are located within a cavity of the suspension housing.

16. The wheel unit of claim 15, wherein the first bevel gear is coupled to a first yoke and a second yoke by a driveshaft, and wherein the first yoke is driven by the prime mover and the second yoke is configured to couple a plurality of wheel units together.

17. The wheel unit of claim 12, wherein the first planet gear includes a first diameter and the second planet gear includes a second diameter, and wherein the first diameter is smaller than the second diameter.

18. The wheel unit of claim 12, wherein the output hub is rotatably coupled to the pivot housing by a housing bearing.

19. The wheel unit of claim 12, wherein an outer surface of the output hub directly engages an inner surface of the wheel rim to rotationally fix the wheel rim to the output hub.

20. A wheel unit for a vehicle, the wheel unit comprising:
   a suspension housing including a pin defining a steering axis;
   a wheel rim rotatable about a rotational axis and configured to pivot about the steering axis, the wheel rim defining a central axis oriented parallel to the steering axis, the central axis of the wheel rim is located less than 150 millimeters from the steering axis; and
   a compound planetary transmission coupled between the suspension housing and the wheel rim, the compound planetary transmission operable to drive the wheel rim about the rotational axis;
   wherein the compound planetary transmission includes an input drive shaft coupled to the suspension housing, a sun gear rotatable about the rotational axis, and a constant velocity joint coupled between the input drive shaft and the sun gear, and wherein the steering axis extends through a portion of the sun gear.

21. The wheel unit of claim 20, wherein the compound planetary transmission includes
   a first planet gear enmeshed with the sun gear,
   a ring gear fixed relative to the wheel rim for co-rotation about the rotational axis,
   a second planet gear enmeshed with the ring gear, and
   a shaft coupled to the first planet gear and the second planet gear.

22. The wheel unit of claim 21, wherein the first and second planet gears are rotatable about the rotational axis.

23. The wheel unit of claim 22, further comprising a transmission housing coupled to the suspension housing by the pin and pivotable about the steering axis, wherein the ring gear is a first ring gear, and wherein the compound planetary transmission includes a second ring gear fixed relative to the transmission housing, and wherein the first planet gear is enmeshed with the second ring gear.

24. The wheel unit of claim 23, wherein the central axis of the wheel rim is located about 80 millimeters from the steering axis.

25. A wheel unit for a vehicle, the wheel unit comprising:
   a suspension housing including a pin defining a steering axis;
   a wheel rim rotatable about a rotational axis and configured to pivot about the steering axis; and
   a compound planetary transmission coupled between the suspension housing and the wheel rim, the compound planetary transmission operable to drive the wheel rim about the rotational axis, the compound planetary transmission including
      a sun gear rotatable about the rotational axis, the sun gear enmeshed with a constant velocity joint,
      a first planet gear enmeshed with the sun gear, the first planet gear including a first diameter, and
      a second planet gear coupled to the first planet gear for co-rotation, the second planet gear including a second diameter greater than the first diameter of the first planet gear.

26. The wheel unit of claim 25, further comprising a transmission housing coupled to the suspension housing by the pin and pivotable about the steering axis, wherein the compound planetary transmission includes an input drive shaft coupled to the suspension housing,
a first ring gear fixed relative to the transmission housing,
a second ring gear fixed relative to the wheel rim for co-rotation about the rotational axis,
a shaft coupled to the first planet gear and the second planet gear, and
wherein the first planet gear is enmeshed with the sun gear and the first ring gear, and wherein the second planet gear is enmeshed with the second ring gear.

27. The wheel unit of claim 25, further comprising a transmission housing coupled to the suspension housing by the pin and pivotable about the steering axis, wherein a portion of the constant velocity joint, the sun gear, the first planet gear, and a portion of the second planet gear are positioned within the transmission housing.

28. The wheel unit of claim 27, wherein the compound planetary transmission includes a first ring gear fixed relative to the transmission housing and a second ring gear fixed relative to the wheel rim for co-rotation about the rotational axis, wherein the first planet gear is enmeshed with the first ring gear and the second planet gear is enmeshed with the second fixed gear, and wherein the first ring gear and a portion of the second ring gear are positioned within the transmission housing.

* * * * *